3,035,065
ISOMALEIMIDES AND A PROCESS FOR THE
PREPARATION THEREOF
Carol K. Sauers, Middlebush, and Robert J. Cotter, New
Brunswick, N.J., assignors to Union Carbide Corporation, a corporation of New York
No Drawing. Filed Nov. 5, 1959, Ser. No. 851,029
15 Claims. (Cl. 260—343.6)

This invention relates to isomaleimides. More particularly, this invention relates to N-substituted isomaleimides and to a process for the preparation thereof.

The N-substituted isomaleimides of the present invention have the general formula:

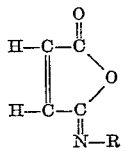

(Formula I)

in which R is a monovalent hydrocarbon radical, or a divalent hydrocarbon radical having as a substituent on its terminal carbon atom a radical having the formula:

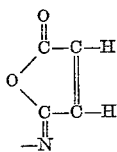

These latter N-substituted isomaleimides are commonly referred to as bis-isomaleimides.

The term "monovalent hydrocarbon radical" or "monovalent hydrocarbon" as used herein refers to unsubstituted hydrocarbon radicals as well as substituted hydrocarbon radicals.

Exemplary of such are the following: alkyl radicals, such as methyl, ethyl, n-propyl, n-butyl, n-hexyl, 2-ethyl-n-hexyl, n-octyl, n-dodecyl, and the like; cycloalkyl radicals, such as cyclohexyl and the like; unsaturated alkyl and cycloalkyl radicals, such as allyl, cyclopentenyl, and the like; halogenated alkyl and cycloalkyl radicals, such as chloroethyl, bromoethyl, fluoroethyl, 2-chloro-n-propyl, 2-bromo-n-propyl, 2-chloro-n-butyl, 3-chloro-n-amyl, 3-bromo-n-amyl, 2-chloro-n-hexyl, 2-chlorocyclohexyl, and the like; alkoxy and aryloxy substituted alkyl and cycloalkyl radicals, such as methoxy-methyl, ethoxy-ethyl, 3-ethoxy-n-propyl, 4-ethoxy-n-butyl, 3-ethoxy-2-ethyl-n-hexyl, 2-methoxycyclohexyl, phenoxymethyl, 2-phenoxyethyl, 3-phenoxy-n-propyl, 2-phenoxy cyclohexyl, and the like; aralkyl radicals, such as benzyl, 2-phenyl ethyl, 3-phenyl-n-propyl, 1-phenyl-n-butyl, 1-phenyl-n-docesyl, and the like; aryl radicals, such as phenyl, naphthyl, and the like; halogenated aryl radicals, such as p-chlorophenyl, p-bromophenyl, p-fluorophenyl, p-iodophenyl, 2-chloronaphthyl, 2-bromonaphthyl, and the like; alkoxy and aryloxy substituted aryl radicals, such as p-methoxyphenyl; p-ethoxyphenyl, p-n-propoxyphenyl, and the like; alkaryl radicals, such as o-methylphenyl, p-ethylphenyl, p-n-propylphenyl, o-n-propylphenyl, o-n-butylphenyl, p-n-dodecylphenyl, p - (2 - ethyl-n-hexyl) phenyl, and the like; nitro substituted aryl radicals, such as p-nitrophenyl, 2-nitronaphthyl, and the like; other suitable radicals include 4-hydroxy-1-naphthyl, and the like.

Representative of isomaleimides wherein R in the general formula previously given is a monovalent hydrocarbon radical are the following:

N-methyl isomaleimide,
N-ethyl isomaleimide,
N-n-propyl isomaleimide,
N-allylisomaleimide,
n-butyl isomaleimide,
N-tertiary butyl isomaleimide,
N-n-hexyl isomaleimide,
N-(2-ethyl-n-hexyl) isomaleimide,
N-n-heptyl isomaleimide,
N-n-nonyl isomaleimide,
N-n-dodecyl isomaleimide,
N-n-docosyl isomaleimide,
N-cyclohexyl isomaleimide,
N-(2-chloroethyl) isomaleimide,
N-(2-bromoethyl) isomaleimide,
N-(2-fluoroethyl) isomaleimide,
N-(2-iodo-n-propyl) isomaleimide,
N-(2-chloro-n-hexyl) isomaleimide,
N-methoxymethyl isomaleimide,
N-benzyl isomaleimide,
N-(2-phenylethyl) isomaleimide,
N-(3-phenyl-n-propyl) isomaleimide,
N-(4-phenyl-n-butyl) isomaleimide,
N-phenyl isomaleimide,
N-naphthyl isomaleimide,
N-(o-chlorophenyl) isomaleimide,
N-(m-bromophenyl) isomaleimide,
N-(p-fluorophenyl) isomaleimide,
N-(o-iodophenyl) isomaleimide,
N-(o-methoxyphenyl) isomaleimide,
N-(m-methoxyphenyl) isomaleimide,
N-(p-ethoxyphenyl) isomaleimide,
N-(p-n-butoxyphenyl) isomaleimide,
N-(p-chloro-m-methylphenyl) isomaleimide,
N-(o-methylphenyl) isomaleimide,
N-(m-methylphenyl) isomaleimide,
N-(o-ethylphenyl) isomaleimide,
N-(m-ethylphenyl) isomaleimide,
N-(p-ethylphenyl) isomaleimide,
N-(o-isopropylphenyl) isomaleimide,
N-(m-isopropylphenyl) isomaleimide,
N-(p-isopropylphenyl) isomaleimide,
N-(o-n-butylphenyl) isomaleimide,
N-(m-n-butylphenyl) isomaleimide,
N-(4-hydroxy-2-naphthyl) isomaleimide,
N-(4-hydroxy-1-naphthyl) isomaleimide, and the like.

The term "divalent hydrocarbon radical" or "divalent hydrocarbon" as used herein is intended to encompass both unsubstituted as well as substituted divalent hydrocarbon radicals. Illustrative of such are alkylene radicals, such as ethylene, trimethylene, tetramethylene, pentamethylene, hexamethylene, 2-ethyl hexamethylene, octamethylene, nonamethylene, decamethylene, and the like; the cycloaliphatic radicals, such as 1,4-cyclohexane, 1,3-cyclohexane, 1,2-cyclohexane, and the like; halogenated alkylene and cycloaliphatic radicals, such as 2-chloroethylene, 2-bromoethylene, 2-fluoroethylene, 2-iodoethylene, 2-chlorotrimethylene, 2-bromotrimethylene, 2-chloropentamethylene, 3-chlorohexamethylene, 2-chlorooctamethylene, and the like; alkoxy and aryloxy substituted alkylene and cycloaliphatic radicals, such as methoxy methylene, ethoxy methylene, ethoxy ethylene, 2-ethoxy trimethylene, 3-ethoxy pentamethylene, 1,4-(2-methoxy cyclohexane), phenoxy ethylene, 2-phenoxy trimethylene, 1,3-(2-phenoxy cyclohexane), and the like; aralkylene radicals, such as phenyl ethylene, 2-phenyl trimethylene, 1-phenyl pentamethylene, 2-phenyl decamethylene, and the like; aromatic radicals, such as phenylene, naphthylene, and the like; halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-methoxyphenylene), 1,4-(2-ethoxyphenylene), 1,4-(2-n-propoxyphenylene), 1,4-(2-phenoxyphenylene), and the like; alkyl substituted aromatic radicals, such as 1,4-(2-methylphenylene), 1,4-(2-ethylphenylene), 1,4-(2-n-propylphenylene), 1,4 - (2 - n - butylphenylene), 1,4-(2-n-dodecylphenylene), and the like.

Among N-substituted isomaleimides wherein R in the formula previously noted is a divalent hydrocarbon radical having as a substituent on its terminal carbon atom a radical having the formula:

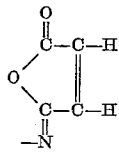

can be noted

N,N'-ethylene bis-isomaleimide,
N,N'-trimethylene bis-isomaleimide,
N,N'-tetramethylene bis-isomaleimide,
N,N'-decamethylene bis-isomaleimide,
N,N'-(1,4-cyclohexane) bis-isomaleimide,
N,N'-(2-chlorotrimethylene) bis-isomaleimide,
N,N'-(2-bromotrimethylene) bis-isomaleimide,
N,N'-(2-chlorotetramethylene) bis-isomaleimide,
N,N'-(3-chlorohexamethylene) bis-isomaleimide,
N,N'-(2-ethoxytetramethylene) bis-isomaleimide,
N,N'-(1-ethoxytetramethylene) bis-isomaleimide,
N,N'-[1,4-(2-methoxycyclohexane)] bis-isomaleimide,
N,N'-(2-phenoxyethylene) bis-isomaleimide,
N,N'-(2-phenoxytrimethylene) bis-isomaleimide,
N,N'-[1,4-(2-phenoxycyclohexane)] bis-isomaleimide,
N,N'-[1,4-(2-nitrocyclohexane)] bis-isomaleimide,
N,N'-phenylethylene bis-isomaleimide,
N,N'-(2-phenylethylene) bis-isomaleimide,
N,N'-(2-phenyltrimethylene) bis-isomaleimide,
N,N'-(2-phenyltetramethylene) bis-isomaleimide,
N,N'-(1-phenyldodecamethylene) bis-isomaleimide,
N,N'-(1,4-phenylene) bis-isomaleimide,
N,N'-(1,5-naphthalene) bis-isomaleimide,
N,N'-[1,4-(2-chlorophenylene)] bis-isomaleimide,
N,N'-[1,4-(2-bromophenylene)] bis-isomaleimide,
N,N'-[1,4-(2-methoxyphenylene)] bis-isomaleimide,
N,N'-[1,4-(2-ethoxyphenylene)] bis-isomaleimide,
N,N'-[1,4-(2-phenoxyphenylene)] bis-isomaleimide,
N,N'-[1,4-(2-methylphenylene)] bis-isomaleimide,
N,N'[1,4-(2-ethylphenylene)] bis-isomaleimide,
N,N'-(4,4'-diphenyl methane) bis-isomaleimide,
N,N'-(4,4'-diphenylether) bis-isomaleimide,
N,N'-[1,4-(2-n-dodecylphenylene)] bis-isomaleimide,
N,N'-(4,4'-benzophenone) bis-isomaleimide,
and the like.

Particularly desirable compounds for purposes of this invention are those wherein R is either a monovalent or divalent radical as previously described having a maximum of 20 carbon atoms and being free of interfering groups such as —COOH and NH₂.

In its broadest aspect, the process by which the N-substituted isomaleimides of the present invention are prepared is conducted by reacting an N-substituted maleamic acid having the general formula:

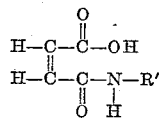

wherein R' is a monovalent hydrocarbon radical or monovalent hydrocarbon as previously defined for R in Formula I, or R' is a divalent hydrocarbon radical or monovalent hydrocarbon, also as previously defined for R in Formula I, having as a substituent on its terminal carbon atom a radical having the formula:

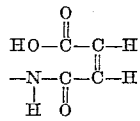

with a carbodiimide having the general formula:

$$R^2-N=C=N-R^3$$

wherein $R^2$ and $R^3$ are hydrocarbon radicals.

Illustrative of suitable hydrocarbon radicals for $R^2$ and $R^3$ can be noted ethyl, n-propyl, isopropyl, n-butyl, tertiary butyl, n-hexyl, 2-ethyl-n-hexyl, n-heptyl, isobutyl, n-octyl, n-dodecyl, n-icosyl, allyl, cyclohexyl, methyl, phenyl, α-naphthyl, tolyl, p-isobutylphenyl, and the like. Suitable carbodiimides include, among others, diethyl carbodiimide, di-n-propyl carbodiimide, diisopropyl carbodiimide, di-n-butyl carbodiimide, di-tertiary-butyl carbodiimide, di-isobutyl carbodiimide, di-n-hexyl carbodiimide, di-(2-ethyl-n-hexyl) carbodiimide, di-n-heptyl carbodiimide, di-n-octyl carbodiimide, di-n-dodecyl carbodiimide, di-phenyl carbodiimide, di-allyl carbodiimide, dicyclohexyl carbodiimide, dimethyl carbodiimide, allyl propyl carbodiimide, allyl cyclohexyl carbodiimide, dodecyl isopropyl carbodiimide, tertiary-butyl propyl carbodiimide, and other like compounds. Particularly desirable carbodiimides are those in which $R^2$ and $R^3$ each contains a maximum of ten carbon atoms.

Various amounts of the carbodiimides and of the N-substituted maleamic acids can be reacted. Generally, from about two-tenths to about five times the stoichiometric amount of carbodiimide required for reaction with the N-substituted maleamic acid is satisfactory. Using more than about five times the stoichiometric amount of carbodiimide does not significantly increase the yield of N-substituted isomaleimide and is economically undesirable. Optimum results are achieved using a stoichiometric amount of carbodiimide. For purposes of stoichiometric calculations, one carbodiimide group, —N=C=N—, is considered to react with one carboxylic group, —COOH.

The preparation of an N-substituted isomaleimide wherein R is a monovalent hydrocarbon radical as previously defined can be illustrated by the reaction between N-n-butyl maleamic acid and dicyclohexyl carbodiimide to produce N-n-butyl isomaleimide. This reaction can be represented by the following equations:

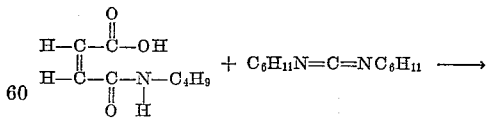

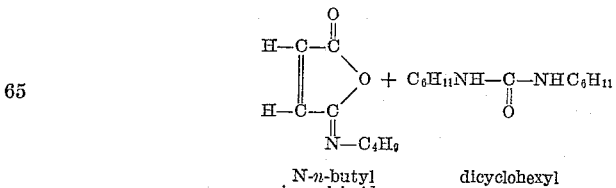

N-n-butyl isomaleimide     dicyclohexyl urea

The preparation of an N-substituted isomaleimide where R is a divalent hydrocarbon having a substituent on its terminal carbon atom as previously defined is exemplified by the reaction between N,N'-(4,4'-diphenylmethane) bis-maleamic acid and dicyclohexyl carbodiimide. This reaction can be represented by the following equations:

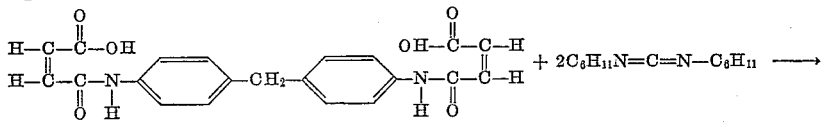

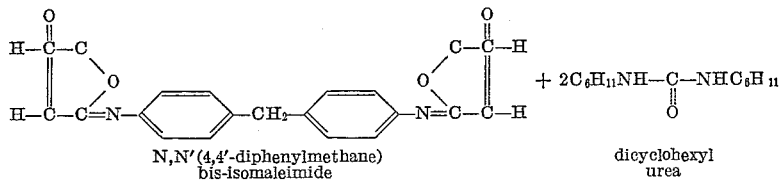

N,N'(4,4'-diphenylmethane) bis-isomaleimide        dicyclohexyl urea

The temperature at which the reaction between the N-substituted maleamic acid and the desired carbodiimide is conducted can be varied over a wide range, from as low as about −70° C. to a temperature below the decomposition temperature of the starting materials and of N-substituted isomaleimide product formed. At temperatures lower than about −70° C., the reaction proceeds sluggishly. A temperature in the range of about −5° C. to about 85° C. is most preferred.

It is also preferred to conduct the reaction between the N-substituted maleamic acids and the carbodiimides in the presence of an organic diluent which is a solvent for the starting materials and is non-reactive with respect to the starting materials and the final product. The use of an organic diluent facilitates removal of the N-substituted isomaleimide from the disubstituted urea which is formed in the reaction mixture.

The actual organic diluent used will depend upon the starting materials and the temperature at which the reaction is to be conducted. The organic diluent should have a boiling point above the reaction temperature. It is customary to use the organic diluent in amounts of at least about 50% by weight based on the weight of the starting materials. The upper limit with respect to the amount of organic diluent used will depend upon the rate at which it is desired to conduct the reaction. The more dilute the reaction mixture, the slower the rate of reaction. From a practical standpoint, the organic diluent is used in amounts up to 500% by weight based on the weight of the starting materials.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as methoxybenzene and the like; aliphatic hydrocarbons, such as n-hexane, n-heptane, and the like; halogenated aliphatic hydrocarbons, such as dichloromethane, 1,2-dichloroethane, and the like; ethers, such as diethyl ether, diethyl ether of ethylene glycol, diethyl ether of 1,3-propylene glycol, dioxane, and the like; aliphatic ketones, such as acetone, methyl ethyl ketone, and the like; also suitable are dimethyl formamide, petroleum ether, and the like.

The reaction between the N-substituted maleamic acid and the carbodiimide compound is conducted, generally, under atmospheric pressure, although if desired, the reaction can be conducted under subatmospheric or superatmospheric pressure.

The process of the present invention is conducted by simply admixing the N-substituted maleamic acid and the carbodiimide compound at the desired temperature. The reaction between the N-substituted maleamic acid and the carbodiimide to produce the N-substituted isomaleimide of the present invention is practically instantaneous in that some isomaleimide is formed immediately upon mixing of the reactants. It is customary, however, to allow the reaction mixture to stand for at least one hour in order to insure that the reaction has proceeded to completion. The termination of the reaction is evidenced by completion of the disubstituted urea precipitation.

Recovery of the N-substituted isomaleimide from the reaction mixture can be accomplished by any one of a number of convenient methods. For example, when using an organic diluent which dissolves the N-substituted isomaleimide but does not dissolve the disubstituted urea, the urea product can be removed as a filter cake and the N-substituted isomaleimide can be passed through a Florisil column to insure removal of unreacted N-substituted maleamic acid. The N-substituted isomaleimide can also be washed with various washing liquids such as water. In those instances in which the N-substituted isomaleimide is a solid, it can be recrystallized from suitable solvents such as the organic liquids previously noted in the specification as organic diluents.

The N-substituted maleamic acid intermediate which can be used in the preparation of the corresponding isomaleimide of the present invention can be obtained by reacting, in suitable solvents, approximately equimolar quantities of a primary mono- or primary diamine with maleic anhydride. In producing an N-substituted maleamic acid having the formula previously given wherein R' is a monovalent hydrocarbon radical, the following primary amines can be used: methylamine, ethylamine, isopropylamine, n-butylamine, isobutylamine, isoamylamine, n-hexylamine, n-heptylamine, n-octylamine, n-dodecylamine, cyclohexylamine, 2-chloroethylamine, 2-bromoethylamine, 2-fluoroethylamine, 2-iodopropylamine, chlorocyclohexylamine, methoxymethylamine, 2-phenoxy-n-propylamine, benzylamine, 2-phenethylamine, 3-phenyl-n-propylamine, 4-phenyl-n-butylamine, naphthylamine, p-toluidine, o-p-xylylidine, o-ethylaniline, m-ethylaniline, p-ethylaniline, o-isopropylaniline, m-isopropylaniline, p-isopropylaniline, o-n-butylaniline, m-n-butylaniline, p-n-butylaniline, p-n-octylaniline, o-chloroaniline, m-bromoaniline, p-fluoroaniline, o-iodoaniline, o-methoxyaniline, m-methoxyaniline, p-ethoxyaniline, p-n-butoxyaniline, o-nitroaniline, p-nitroaniline, 4-chloro-3-methylaniline, 4-sulfamylaniline, and the like.

In producing an N-substituted maleamic acid having the formula previously given wherein R' is a divalent hydrocarbon radical, the following primary diamines can be used: 1,2-diaminoethane, 1,3-diamino-n-propane, 1,4-diamino-n-butane, 1,5-diamino-n-pentane, 1,6-diamino-n-hexane, 1,10-diamino-n-decane, 1,4-phenylene-diamine, 4,4'-diaminodiphenyl methane, and the like. Process for producing maleamic acids is further described in Example 1 of this application and also in a book by L. A. Flett and W. H. Gardner, "Maleic Anhydride Derivatives," published by John Wiley & Sons, Inc., which is incorporated herewith by reference.

The N-substituted isomaleimides of the present invention can be used as fungicides and defoliants. These compounds can also be isomerized to the corresponding maleimides which are known compounds having wide utility as insecticides. The so-called bis-isomaleimides of the present invention have particular utility in that they can be polymerized with primary diamines to produce polymers which can be molded into various articles, such as lamp bases, television cabinets, and the like, as well as extruded into film material which can be used as wrapping material for food articles, such as bread, meat, and the like. Moreover, these polymers can be cross-linked with sulfur to form infusible, insoluble products.

The following examples further illustrate the present invention and are not intended to limit the scope thereof in any manner.

EXAMPLE 1

*Preparation of N-Phenyl Isomaleimide*

Into a dry, round bottom Pyrex glass flask equipped with a stirrer, thermometer, dropping funnel, and reflux condenser, there was charged 150 ml. of dichloromethane having 8 grams (0.081 mole) of maleic anhydride dissolved therein. 7.6 grams (0.081 mole) of aniline was added to the contents of the flask, thereby producing a slurry of N-phenyl maleamic acid. To the resultant slurry there was added 16.7 grams (0.081 mole) of N,N'-dicyclohexyl carbodiimide dissolved in 30 ml. of dichloromethane. The reaction mixture was stirred for two hours at room temperature (about 25° C.) then filtered, removing the precipitated dicyclohexyl urea as a filter cake. The solvent was removed under reduced pressure, yielding a solid product. The product was then dissolved in about 50 ml. of benzene at room temperature and passed through a column of Florisil which had been washed with n-pentane. The product was then recrystallized from a 50—50 (by volume) mixture of benzene and petroleum ether yielding 13.15 grams of N-phenyl isomaleimide, which was 94% of the theoretical yield.

*Analysis.*—Calculated for $C_{10}H_7O_2N$: C, 69.36; H, 4.07; N, 8.09. Found: C, 69.61; H, 4.17; N, 8.27.

An infra-red spectrum analysis indicated a strong band at $5.6\mu$ which is consistent with the isomaleimide structure.

EXAMPLE 2

*Preparation of N,N'-(4,4'-Diphenylmethane) Bis-Isomaleimide*

Into a dry, round bottom, Pyrex glass flask equipped with a stirrer, thermometer, dropping funnel, and reflux condenser containing 50 ml. of dichloromethane and 20 ml. of diethyl ether there was charged 19.7 grams (0.05 mole) of N,N'-(4,4'-diphenylmethane- bis-maleamic acid. A solution of 20.6 grams (0.1 mole) of dicyclohexyl carbodiimide in 25 ml. of dichloromethane was added dropwise into the flask over a period of 40 minutes with constant stirring. After the last addition of the dicyclohexyl carbodiimide solution, the reaction mixture was stirred for 3 hours at room temperature. The mixture was filtered, removing the precipitated N,N'-dicyclohexyl urea as a filter cake. The solvents were removed under reduced pressure. Sixteen grams of N,N'-(4,4'-diphenylmethane) bis-isomaleimide corresponding to a yield of 89% based on the theoretical yield were obtained. Melting point of the product was 150° C.–151° C. The melting point of a mixture of N,N'-(4,4'-diphenylmethane) bis-isomaleimide prepared as described and N,N'-(4,4'-diphenylmethane) bis-maleimide was depressed.

*Analysis.*—Calculated for $C_{21}H_{14}N_2O_4$: C, 70.38; H, 3.94; N, 7.82. Found: C, 70.81; H, 4.31; N, 7.66.

EXAMPLE 3

*Preparation of N,N'-Hexamethylene Bis-Isomaleimide*

Into a dry, round bottom, Pyrex glass flask equipped with a stirrer, thermometer, dropping funnel, and reflux condenser there was charged a slurry of 31.2 grams (0.1 mole) of N,N'-hexamethylene bis-maleamic acid in 500 ml. of dichloromethane. To this slurry there was then added a solution of 41.2 grams (0.2 mole) of dicyclohexyl carbodiimide in 50 ml. of dichloromethane over a period of one hour. The reaction mixture was stirred at room temperature for 22 hours and then filtered, removing the precipitated N,N-dicyclohexyl urea as a filter cake. The solvent was removed under reduced pressure. The residual white solid was dissolved in 100 ml. benzene and passed through a column of Florisil which had been washed with petroleum ether. Fifteen grams of N,N'-hexamethylene bis-isomaleimide were recovered having a melting point of 93° C.–95° C. An analytical sample prepared by recrystallization from a 50—50 mixture (by volume) of benzene and diethyl ether was analyzed.

*Analysis.*—Calculated for $C_{14}H_{16}N_2O_2$: C, 60.86; H, 5.84; N, 10.14. Found: C, 60.58; H, 5.75; N. 10.2.

The infra-red spectrum of the product contained bands at $5.55\mu$, $5.89\mu$, and $6.12\mu$ which is consistent with the isomaleimide structure.

EXAMPLE 4

*Preparation of N-n-Butyl Isomaleimide*

Into a dry, round bottom, Pyrex glass flask equipped with a stirrer, thermometer, dropping funnel, and reflux condenser, there was charged 8.6 grams (0.05 mole) of N-n-butylmaleamic acid dissolved in 50 ml. of dichloromethane. A solution of 10.3 grams (0.05 mole) of dicyclohexyl carbodiimide in about 30 ml. of dichloromethane was then added dropwise to the contents of the flask. The reaction mixture was stirred at room temperature over a period of three hours, then filtered, removing the precipitated N,N-dicyclohexyl urea as a filter cake. The solvent was removed under reduced pressure. Four grams of N-n-butylisomaleimide having a boiling point of 80°–83° C. at 3 mm. Hg, an index of refraction at 25° C. of 1.4890 were recovered. Infra-red spectrum analysis showed bands at $5.55\mu$ and $5.9\mu$ which is consistent with the isomaleimide structure.

EXAMPLE 5

*Preparation of N-(2,4-Dimethylphenyl) Isomaleimide*

Into a round bottom Pyrex glass flask equipped with a stirrer, thermometer, dropping funnel, and reflux condenser containing a slurry of 45 grams (0.2 mole) of N-(2,4-dimethylphenyl) maleamic acid in 500 ml. of dichloromethane, there was added dropwise and with stirring over a period of 30 minutes a solution of 41.2 grams (0.2 mole) of N,N'-dicyclohexyl carbodiimide in 100 ml. of dichloromethane. The reaction mixture was stirred for 16 hours at room temperature, then filtered, removing the precipitated N,N'-dicyclohexyl urea as a filter cake. The solvent was removed from the filtrate under reduced pressure. The product was taken up by a small quantity of benzene and the solution passed through a Florisil column which had been washed with pentane. The product was then isolated by evaporating off the benzene. Forty grams of N-(2,4-dimethylphenyl) isomaleimide were recovered in the form of small, orange colored, needle-like crystals. The yield was 95% of the theoretical yield. Melting point of the product was 55° C.–57° C.

*Analysis.*—Calculated for $C_{12}H_{11}O_2N$: C, 71.62; H, 5.51; N, 6.96. Found: C, 70.66; H, 5.40; N, 7.45.

Infra-red spectrum analysis indicated strong bands at $5.6\mu$ and $5.9\mu$ which are indicative of the isomaleimide structure.

EXAMPLE 6

*Preparation of N-o-Tolyl Isomaleimide*

Into a round bottom Pyrex glass flask equipped with a stirrer, thermometer, dropping funnel, and reflux condenser containing 43 grams (0.2 mole) of N-o-tolyl isomaleimide in 300 ml. of dichloromethane, there was added dropwise and with stirring over a period of 30 minutes a solution of 41.2 grams (0.2 mole) of N,N'-dicyclohexyl carbodiimide in 40 ml. of dichloromethane. The reaction mixture was stirred for 24 hours at room temperature, then filtered, removing the precipitated N,N'-dicyclohexyl urea as a filter cake. The solvent was removed from the filtrate under reduced pressure. The product was taken up by a small quantity of benzene and the solution passed through a column of Florisil which had been washed with n-pentane. The product was isolated by evaporating off the benzene. Forty grams of N-o-tolyl isomaleimide were recovered. This corresponds to a yield of 99%. Melting point of the product was 37° C.–39° C.

*Analysis.*—Calculated for $C_{11}H_9O_2N$: C, 70.58; H, 4.85; N, 7.48. Found: C, 70.85; H, 5.02; N, 7.54.

Infra-red spectrum analysis indicated a strong band at 5.6μ which is indicative of the isomaleimide structure.

EXAMPLE 7

*Preparation of N-o-Chlorophenyl Isomaleimide*

Into a round bottom Pyrex glass flask equipped with a stirrer, thermometer, dropping funnel, and reflux condenser containing a mixture of 45 grams (0.2 mole) of N-o-chlorophenyl maleamic acid in 1 liter of dichloromethane, there was added dropwise and with stirring over a 30 minute period 41.2 grams (0.2 mole) of N,N'-dicyclohexyl carbodiimide in 40 ml. of dichloromethane. The mixture was stirred for 24 hours at room temperature then filtered, removing the precipitated N,N'-dicyclohexyl urea. The filtrate was evaporated to a yellow solid residue under reduced pressures. The solid residue was taken up with a small amount of benzene and the solution passed through a column of Florisil which had been washed with n-pentane. The product was then isolated by evaporating off the benzene. Forty grams of N-o-chlorophenyl isomaleimide in the form of yellow crystals were recovered. The yield was 98% of the theoretical yield. The product had a melting point of 62° C.–66° C.

*Analysis.*—Calculated for $C_{10}H_6O_2N$: C, 57.85; H, 2.91; N, 6.75. Found: C, 58.35; H, 2.73; N. 6.58.

Infra-red spectrum analysis indicated a strong band at 5.55μ which is indicative of the isomaleimide structure.

What is claimed is:

1. An N-substituted isomaleimide of the formula:

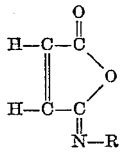

in which R is a member selected from the group consisting of aliphatic monovalent hydrocarbons and divalent hydrocarbons, said divalent hydrocarbons having as a substituent on their terminal carbon atom a radical of the formula:

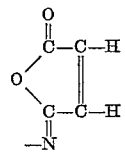

said monovalent hydrocarbons and said divalent hydrocarbons having a maximum of 20 carbon atoms.

2. An N-substituted isomaleimide of the formula:

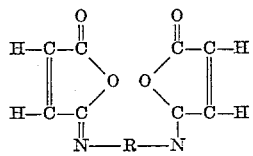

wherein R is divalent hydrocarbon having a maximum of 20 carbon atoms.

3. An N-substituted isomaleimide of the formula:

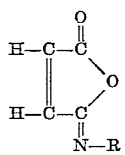

wherein R is aliphatic monovalent hydrocarbon having a maximum of 20 carbon atoms.

4. An N-substituted isomaleimide of the formula:

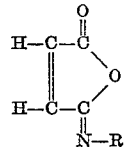

wherein R is alkyl having a maximum of 20 carbon atoms.

5. An N-substituted isomaleimide of the formula:

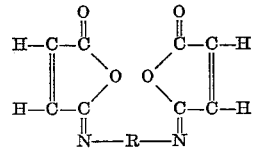

wherein R is alkylene having a maximum of 20 carbon atoms.

6. An N-substituted isomaleimide of the formula:

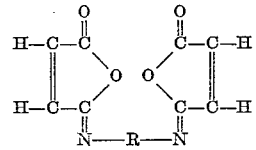

wherein R is arylene having a maximum of 20 carbon atoms.

7. N-n-butyl isomaleimide.
8. N,N'-(4.4'-diphenyl methane) bis-isomaleimide.
9. N,N'-hexamethylene bis-isomaleimide.
10. Process for the preparation of an N-substituted isomaleimide which comprises admixing an N-substituted maleamic acid of the formula:

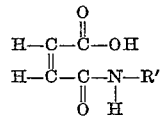

in which R' is a member selected from the group consisting of monovalent hydrocarbons and divalent hydrocarbons, said divalent hydrocarbons having as a substituent on their terminal carbon atom a radical of the formula:

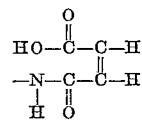

said monovalent hydrocarbons and said divalent hydrocarbons each having a maximum of 20 carbon atoms, with a carbodiimide of the formula:

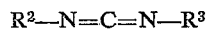

$$R^2-N=C=N-R^3$$

wherein $R^2$ and $R^3$ are hydrocarbon radicals, for a period of time sufficient to produce the corresponding N-substituted isomaleimide.

11. Process as defined in claim 9 wherein the reaction is conducted at a temperature ranging from about —70° C. to a temperature below the decomposition temperature of the reactants and of the N-substituted isomaleimide formed.

12. Process as defined in claim 9 wherein the reaction is conducted at a temperature in the range of about —5° C. to about 85° C.

13. Process as defined in claim 10 wherein the carbodiimide is present in amounts of from about 0.2 to about 5 times the stoichiometric amount required for complete reaction with the N-substituted maleamic acid.

14. Process for the preparation of an N-substituted isomaleimide which comprises admixing in an organic diluent at a temperature of about −5° C. to about 85° C. an N-substituted maleamic acid of the formula:

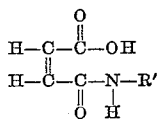

wherein R′ is monovalent hydrocarbon having a maximum of 20 carbon atoms with a carbodiimide of the formula:

$$R^2-N=C=N-R^3$$

wherein $R^2$ and $R^3$ are hydrocarbon radicals each having a maximum of 10 carbon atoms for a period of time sufficient to produce the corresponding N-substituted isomaleimide, said carbodiimide being present in an amount of from about 0.2 to about 5 times the stoichiometric amount required for complete reaction with the N-substituted maleamic acid.

15. Process for the preparation of an N-substituted isomaleimide which comprises admixing in an organic diluent at a temperature of about −5° C. to about 85° C. an N-substituted maleamic acid of the formula:

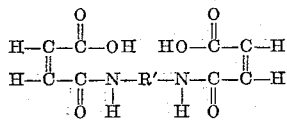

wherein R′ is divalent hydrocarbon having a maximum of 20 carbon atoms with a carbodiimide of the formula:

$$R^2-N=C=N-R^3$$

wherein $R^2$ and $R^3$ are hydrocarbon radicals each having a maximum of 10 carbon atoms for a period of time sufficient to produce the corresponding N-substituted isomaleimide, said carbodiimide being present in an amount of from about 0.2 to about 5 times the stoichiometric amount required for complete reaction with the N-substituted maleamic acid.

References Cited in the file of this patent
UNITED STATES PATENTS 2,262,262    Speer ---------------- Nov. 11, 1941

OTHER REFERENCES

Piutti: Gazz. Chim. Ital., vol 40, pages 513–15 (1910).
Tsou et al.: J. Am. Chem Soc., vol. 77, pages 4613–4615 (1955).

UNITED STATES PATENT OFFICE
CERTIFICATE OF CORRECTION

Patent No. 3,035,065  May 15, 1962

Carol K. Sauers et al.

It is hereby certified that error appears in the above numbered patent requiring correction and that the said Letters Patent should read as corrected below.

Column 8, lines 62 and 63, for "isomaleimide" read -- maleamic acid --; column 10, lines 62 and 67, for the claim reference numeral "9", each occurrence, read -- 10 --.

Signed and sealed this 31st day of March 1964.

(SEAL)
Attest:
ERNEST W. SWIDER

Attesting Officer

EDWARD J. BRENNER

Commissioner of Patents